(12) United States Patent
Wang et al.

(10) Patent No.: US 11,627,307 B2
(45) Date of Patent: Apr. 11, 2023

(54) TRANSPORT CONTROLLED VIDEO CODING

(71) Applicant: Intel Corporation, Santa Clara, CA (US)

(72) Inventors: Changliang Wang, Bellevue, WA (US); Ximin Zhang, San Jose, CA (US); Jill Boyce, Portland, OR (US); Sang-Hee Lee, San Jose, CA (US); Scott Janus, Loomis, CA (US); Yunbiao Lin, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/252,843

(22) PCT Filed: Sep. 28, 2018

(86) PCT No.: PCT/CN2018/108208
§ 371 (c)(1),
(2) Date: Dec. 16, 2020

(87) PCT Pub. No.: WO2020/061990
PCT Pub. Date: Apr. 2, 2020

(65) Prior Publication Data
US 2021/0218954 A1 Jul. 15, 2021

(51) Int. Cl.
*H04N 7/12* (2006.01)
*H04N 19/102* (2014.01)
*H04N 19/146* (2014.01)

(52) U.S. Cl.
CPC ......... *H04N 19/102* (2014.11); *H04N 19/146* (2014.11)

(58) Field of Classification Search
CPC .. H04N 19/102; H04N 19/146; H04N 19/124; H04N 19/172; H04N 19/164; H04N 19/107; H04N 19/184
(Continued)

(56) References Cited

U.S. PATENT DOCUMENTS

2006/0088094 A1  4/2006  Cieplinski et al.
2006/0095943 A1* 5/2006  Demircin ............. H04N 19/166
                                                        725/81
(Continued)

FOREIGN PATENT DOCUMENTS

CN    1848958 A    10/2006
CN    102177671 A   9/2011
(Continued)

OTHER PUBLICATIONS

Notification of Transmittal of the International Search Report and the Written Opinion of the International Searching Authority for PCT Application No. PCT/CN2018/108208 dated Jun. 27, 2019, 10 pages.
(Continued)

*Primary Examiner* — Gims S Philippe
(74) *Attorney, Agent, or Firm* — Jaffery Watson Mendonsa & Hamilton LLP

(57) ABSTRACT

Embodiments are generally directed to transport controlled video coding. An embodiment of an apparatus includes one or more processors to process data; a memory to store data, including data for video streaming; and a video processing mechanism including an encoder and a transport mechanism, wherein the video processing mechanism is to generate a prediction of channel throughput for a network channel, encode one or more bitstreams based on the prediction, including encoding a plurality of bitstreams including a first bitstream and a second bitstream if the prediction indicates
(Continued)

an increase or decrease in channel throughput and encoding a single bitstream if the prediction indicates a stable channel throughput; and select a bitstream of the one or more bitstreams for a current frame.

19 Claims, 6 Drawing Sheets

(58) Field of Classification Search
USPC .................................................. 375/240.02
See application file for complete search history.

(56) References Cited

U.S. PATENT DOCUMENTS

| | | | |
|---|---|---|---|
| 2007/0153916 A1* | 7/2007 | Demircin | H04N 21/23805 375/240.26 |
| 2012/0307886 A1* | 12/2012 | Agarwal | H04W 4/18 375/240.02 |
| 2013/0044183 A1* | 2/2013 | Jeon | H04N 19/395 348/43 |
| 2013/0263200 A1 | 10/2013 | Li et al. | |
| 2013/0322516 A1 | 12/2013 | Zhang | |
| 2015/0071061 A1* | 3/2015 | Sahu | H04L 47/30 370/230 |
| 2016/0173875 A1* | 6/2016 | Zhang | H04N 19/436 375/240.03 |
| 2016/0182906 A1 | 6/2016 | Panchagnula et al. | |
| 2019/0261007 A1* | 8/2019 | Emmanuel | H04W 24/02 |
| 2019/0342551 A1* | 11/2019 | Zhu | H04N 19/149 |

FOREIGN PATENT DOCUMENTS

| | | |
|---|---|---|
| CN | 102427531 A | 4/2012 |
| CN | 112715028 A | 4/2021 |
| EP | 2530997 A1 | 12/2012 |
| EP | 3857869 A | 8/2021 |
| KR | 10-2021-0064116 A | 6/2021 |
| WO | 20170118470 A1 | 7/2017 |

OTHER PUBLICATIONS

Extended European Search Report for EP Application No. 18935548.0, dated Jun. 10, 2022, 9 pages.
Sadjad Fouladi—Catherine Wu+ Riad S Wahby—Keith Winstein—Stanford University et al: "Salsify: Low-Latency Network Video Through Tighter Integration Between a Video Codec and a Transport Protocol", USENIX, The Advanced Computing Systems Association, Apr. 9, 2018 (Apr. 9, 2018), pp. 274-289, XP061025590, Retrieved from the Internet: URL : https://www.usenix.org/sites/default/f iles/ nsdi18_full_proceedings_interior.pdf [retrieved on Apr. 9, 2018].

* cited by examiner

TRANSPORT CONTROLLED VIDEO CODING

CLAIM OF PRIORITY

This application claims, under 35 U.S.C. § 371, the benefit of and priority to International Application No. PCT/CN2018/108208, filed Sep. 28, 2018, titled TRANSPORT CONTROLLED VIDEO CODING, the entire content of which is incorporated herein by reference.

TECHNICAL FIELD

Embodiments described herein generally relate to the field of data processing and, more particularly, transport controlled video coding.

BACKGROUND

Live video streaming has been utilized for video conferencing for several years, and the use of this technology has continued to grow as this has been adapted for handheld devices. The use of live video streaming has surged in popularity and importance as this technology has been implemented cloud video gaming.

Video streaming is dependent on network data throughput as delays in data can greatly damage the user experience in utilizing the streaming operation. Network throughput (which may also be referred to as network bandwidth) can change quickly with network conditions and usages, and thus video applications are required to respond quickly to the conditions to avoid data delays becoming apparent to the user.

However, conventional technologies presume that there will be gradual changes in network throughput, and thus large data delays occur when bandwidth drops rapidly because the video streaming structure does not respond quickly enough. The conventional technologies will also provide slow response to the opposite situation in which bandwidth is improving quickly, and thus will not implement improvements in video streaming quality fast enough to take full advantage of the improved bandwidth.

Improvements to video streaming to address rapid bandwidth changes have been suggested, but the suggested technologies suffer from deficiencies such as encoding complexity, very large memory requirements, and the need for instant channel feedback, and thus these concepts have not proven practical for implementation into real world applications.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are generally directed to transport controlled video coding.

In some embodiments, an apparatus, system, or process provides for transport controlled video coding to improve video streaming performance in varying network throughput conditions. In some embodiments, a future channel bandwidth change is estimated based on the channel feedback, with two bitstreams being generated based on the estimated bandwidth if network bandwidth increase or decrease is detected, with transport is to select the bitstream for transmission based on instant channel change.

From the early days of video conference systems (such as WebEx®) to today's popular resources (for example Microsoft Skype, Google Hangouts, FaceTime®, and WebRTC), real-time video streaming has been one of the most important internet video applications. With the recent emerging market of cloud video gaming, real-time video streaming is becoming even more important in the market. The cloud gaming market is estimated to be over 20 billion dollars in 2019, and continuing to grow.

In all these applications, the ability to encode and send (transmit) video with very low latency is the most important factor in ensuring that the user's experience is positive, particularly for applications that require user interactions. Any signal delays are immediately apparent to users, and such delays can greatly degrade the experience of a user in a game environment or other live video system.

In conventional solutions, the video encoder is responsible for encoding the video with an average bit rate that reflects the estimated network bandwidth. The transport is then responsible for sending the encoded video within packets, handling the network communication and bandwidth variations, and providing estimated network bandwidth to the video encoder. Although the video encoder is adjusted according to the transport feedback, the video encoder and transport are loosely coupled. The conventional video encoder rate control continues to rely on a model that presumes a gradual rate change in network bandwidth, with the video encoder selecting a conservative target bitrate based on the average channel capacity. If the channel bandwidth changes, the encoder will generally reset to a new target bitrate to encode from certain reset point. Between reset points, transport will either delay the transmission or simple drop the frame with the suddenly dropped network throughput. In general, this conventional target bitrate oriented encoding cannot adapt fast enough to cope with rapid network throughput change.

Figure 1:
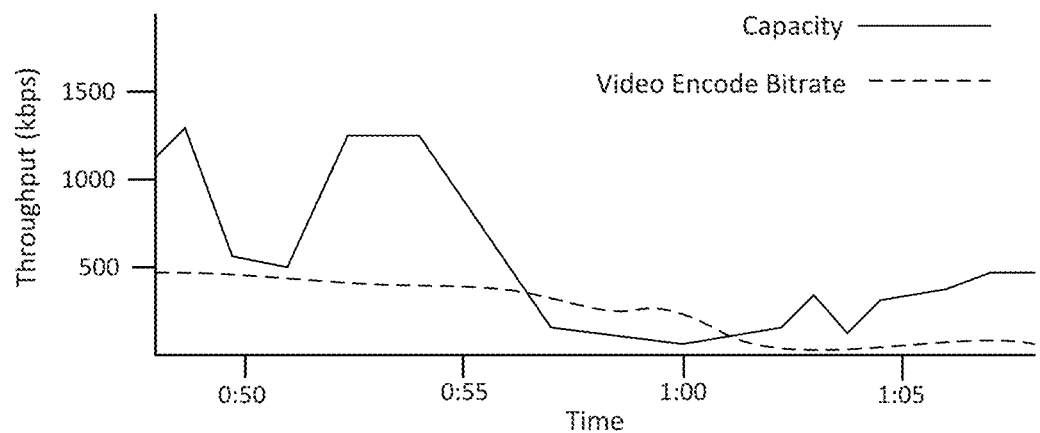
FIGS. 1 and 2 illustrate of delays in a video stream service caused by rapid bandwidth variation.
Figure 2:
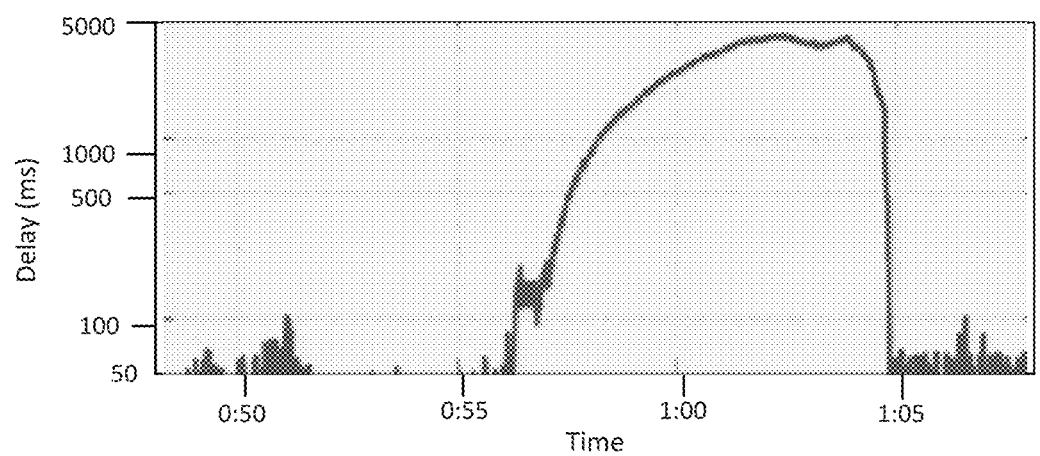

FIGS. 1 and 2 illustrate of delays in a video stream service caused by rapid bandwidth variation. In a conventional video processing structure, huge delays and frame drops can occur if there is a rapid network throughput drop. FIG. 1 illustrates a particular example of a video conferencing service with actual test scenarios, providing a graph of throughput over time that includes network capacity (solid line) and the video encode bitrate requirements of the video conferencing service (dashed line). FIG. 2 is an illustration of the signal delay occurring in the video service over the same period. As can be seen in FIGS. 1 and 2, very large delays result when the network capacity drops quickly. For applications such as real time game streaming, the delay illustrated in FIG. 2 will not be acceptable.

In the reverse scenario, when network throughput is rapidly improving over time, the existing solutions are similarly unable to respond quickly enough to provide the quality of service that that could be achieved with the available bandwidth. Essentially, a conventional apparatus or system will not respond quickly enough to allow the service quality to be increased to take advantage of the throughput that is available.

Scalable video coding such as SVC (Scalable Video Coding) for H.264 (Annex G extension of the H.264/MPEG-4 AVC video compression standard) and SHVC (Scalable Extension of High-Efficiency Video Coding (HEVC)) for H.265 video compression has been developed to handle variable channel conditions. Although scalable video coding can in theory provide quick response to network variations if a large enough number of layers are used, scalable video coding has not generally been accepted for commercial adoption due to its high encoding complexity and its low compression efficiency for stable network conditions.

Recently, Sajed Fouladi, et al., have presented a suggested solution in the paper "Salsify: Low-Latency Network Video through Tighter Integration between a Video Codec and a Transport Protocol". The Salsify solution basically generates two bitstreams for each frame (using two encoders to encode each frame at the same time, or encoding each frame twice and buffering all the encoding states), and only transmitting one bitstream according to the transport feedback. This solution shows improvement for jittering channel conditions but requires at least double the encoding complexity in comparison with conventional structures. Further, the memory requirement for Salsify is extremely large, and instant channel feedback is required for operation. For these reasons, it is not currently practical to integrate this technology into products.

In some embodiments, an apparatus, system, or process provides a novel technology to provide quick video coding response to rapidly changing network conditions, thus greatly reducing the resulting signal delay. In some embodiments, the apparatus, system, or process addresses provides operation to achieve low latency and quality improvements that are similar to the Salsify technology, while minimizing the disadvantages regarding encoding complexity, memory requirements, and channel feedback.

Figure 3:
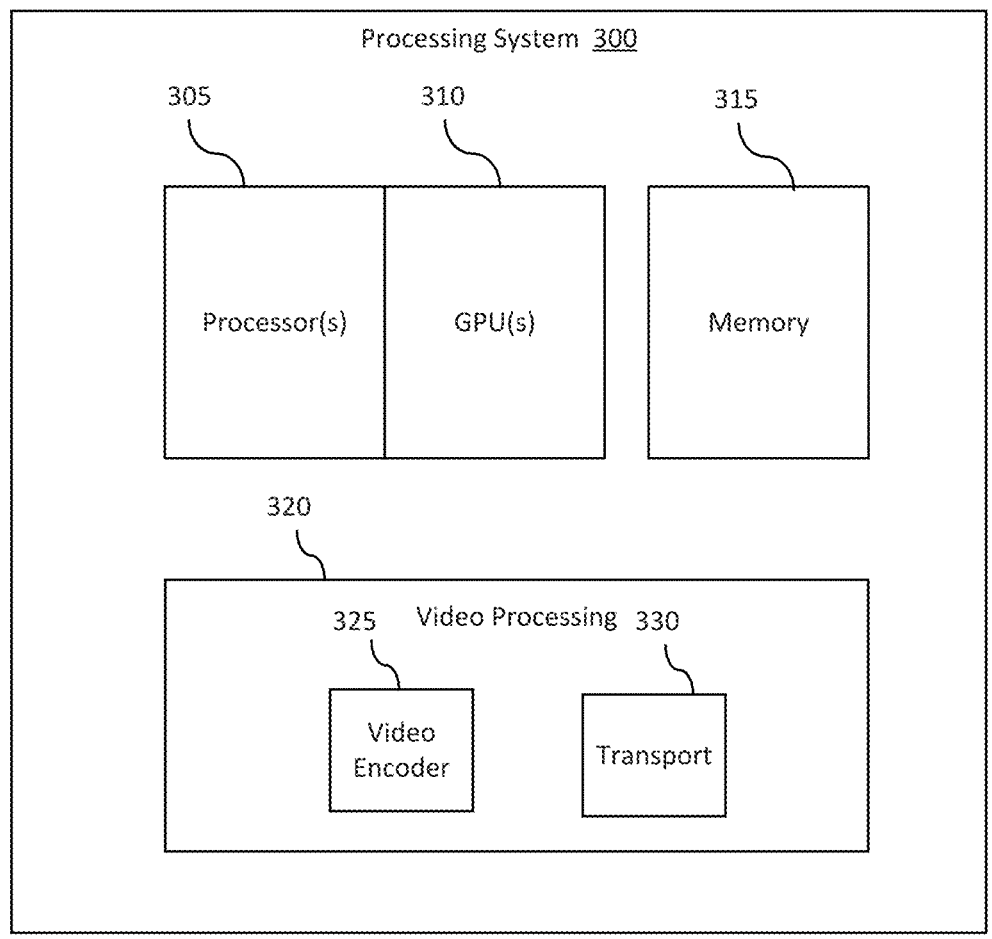
FIG. 3 is an illustration of a system or apparatus to provide for transport controlled video coding according to some embodiments.

FIG. 3 is an illustration of a system or apparatus to provide for transport controlled video coding according to some embodiments. In some embodiments, a processing system 300, such as processing system 600 illustrated in FIG. 6, includes one or more processor cores. In some embodiments, the processing system 300 is structured to include one or more processors 305, which may for example include one or more CPUs (Central Processing Units) (which may operate as a host processor), such as central processing unit 612 in FIG. 6, having one or more processor cores, and one or more graphics processing units (GPUs) 310, such as the graphics processing unit 614 in FIG. 6, having one or more graphics processor cores, wherein the GPUs may be included within or separate from the one or more processors 205. GPUs may include, but are not limited to, general purposed graphics processing units (GPGPUs). The processing system 300 further includes a memory 315 for the storage for data, including data for live video streaming processing.

As illustrated in FIG. 3, the processing system 300 provides video processing 320 to produce live video streaming, where the live video processing including transport controlled video streaming to provide quick response to rapidly changing network throughput. The video processing includes, but is not limited to, a video encoder 325 and a transport mechanism 330. The video encoder provides scalable video coding, and includes application of a video compression standard that may include H.264, H.265, or a future video compression standard.

In some embodiments, the video processing 300 is to provide for transport controlled video coding in which an estimate is made regarding the current bandwidth of a network. In some embodiments, the video encoder 325 is to encode multiple bitstreams, such as a first bitstream and a second bitstream, based on the bandwidth estimate if the estimate indicates an increasing or decreasing bandwidth, wherein, for example, the first bitstream is based on a stable bandwidth and the second bitstream is based on increasing or decreasing bandwidth. In some embodiments, the video processing 300 is to select one of the generated bitstreams based on instant channel feedback if this is available.

Figure 4:
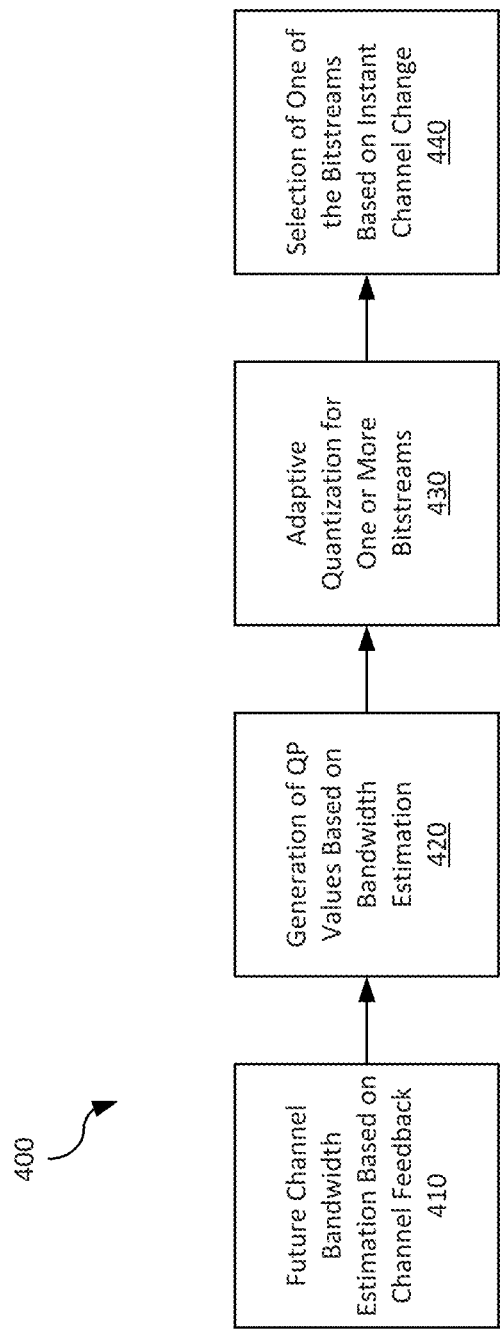
FIG. 4 is an illustration of transport controlled video coding operations according to some embodiments.

FIG. 4 is an illustration of transport controlled video coding operations according to some embodiments. In some embodiments, the operations for transport controlled video coding include future channel bandwidth estimation based on channel feedback 410. In some embodiments, a future channel bandwidth change is estimated based on channel feedback, where, for example, the estimate may be either an estimate of a stable channel bandwidth, an increasing channel bandwidth, or a decreasing channel bandwidth.

In some embodiments, transport controlled video coding further includes generation of one or more quantization parameters (QPs) based on the future channel bandwidth estimate 420. In some embodiments, the generation of one or more QPs may include the generation of multiple QPs when a future channel bandwidth estimate predicts an increasing channel bandwidth or a decreasing channel bandwidth.

In some embodiments, the operations further include adaptive quantization to generate one or more bitstreams based on the generated QP values 430. In some embodiments, multiple bitstreams (such as a first bitstream and a second bitstream) are generated based on the estimated bandwidth, with one pass encoding for each frame. In some embodiments, the first bitstream is generated based on a stable channel bandwidth, and a second bitstream may additionally be generated based on an increased channel bandwidth or a decreased channel bandwidth.

In some embodiments, the operations further include selection of a bitstream for transport based on the instant channel change 440 if such instant channel change information is available. In some embodiments, no target bitrate is set in an encoding process, and the encoding process is tightly coupled to the transport and adjusted according to real time channel conditions. An embodiment may be seamlessly integrated into a current video codec as no major modifications are needed to use it to replace the current streaming solutions available on the market. An embodiment may be applied to provide assistance in cloud gaming, wireless display, and video conferencing, each of which requires extremely low latency for a positive user experience.

In some embodiments, the transport channel can be used to generate network condition feedback to the encoder. The channel provides feedback on a packet basis, and may be utilized to quickly provide channel throughput changes (moving up, stable or moving down).

In some embodiments, if the channel prediction shows that the channel throughput is moving upward, two target frame sizes are generated. The first target frame size is derived based on an assumption that there is no network throughput change. Therefore, the first target frame size is based on the previous frame and may be the same size as the size of previous frame (unless there is a disruptive change in the video stream such as, for example, sudden movement or a scene change in the video stream). The second target frame size is larger than the size of the previous frame, and it is derived based on the projected throughput increase. In some embodiments, to avoid one user using too much network capacity, the second target frame size may be capped by a dynamic threshold that is based on an average bitrate consumption of a sliding window. A first QP is then derived based on the first target frame size and a second QP is derived based on the second target frame size. In some embodiments, if the second QP is less than a threshold, video resolution may be increased, thus increasing signal quality. Otherwise, the first QP is used for intra/inter prediction and coding mode decision. After the transform, quantization is performed twice to generate two sets of bitstreams for the current frame. In some embodiments, if instant channel feedback is available, a new target frame size is estimated and the bitstream size that closer to this new target frame size (which may be referred to herein as an instant target frame size) is selected. Otherwise, the bitstream based on the second target frame size, i.e., the bitstream based on an increased channel bandwidth, is selected and sent out.

In some embodiments, if the channel prediction instead shows that the channel throughput is stable, only one target frame size is generated, and a single QP is derived accordingly. This single QP is used for the entire following encoding process. After the bitstream is generated, the bitstream is send out (as there is no choice to be made between multiple bitstreams in the stable throughput case). In this circumstance, only a single bitstream is generated. As the most common circumstance is a stable channel bandwidth, the generation of a second bitstream not be required at most times.

In some embodiments, if the channel prediction predicts that the channel throughput is moving downward, two target frame sizes are generated. In this circumstance, the first target frame size uses a same or similar target frame size as the previous frame, while the second target frame size is smaller than the size of the previous frame and is derived based on projected throughput decrease. A first QP is derived based on the first target frame size and a second QP is based on the second target frame size. In some embodiments, if the second QP is larger than a threshold, a skip signal is sent such that the whole frame is encoded as a skip and whole encoding process is saved; or video resolution may be decreased, thus reducing bandwidth requirements. Otherwise, the first QP is used for intra/inter prediction and coding mode decision. After the transform, the quantization is performed twice to generate two bitstreams for the current frame. In some embodiments, if the instant channel feedback is available, a new target frame size is estimated and the bitstream size that is closer to the new instant target frame size is selected. Otherwise, the bitstream based on the second target frame size, i.e., the bitstream based on an increased channel bandwidth, is selected and sent out.

In some embodiments, an apparatus, system, or process includes adaptive quantization. In contrast with conventional approaches that use only one QP to perform quantization, an embodiment may use multiple QP values, such as two QPs to generate two sets of quantization coefficients at the same time. Entropy coding is applied subsequently to generate two bitstreams, the bitstreams being a first bitstream based on a stable channel bandwidth and a second bitstream based on an increasing channel bandwidth.

Figure 5:
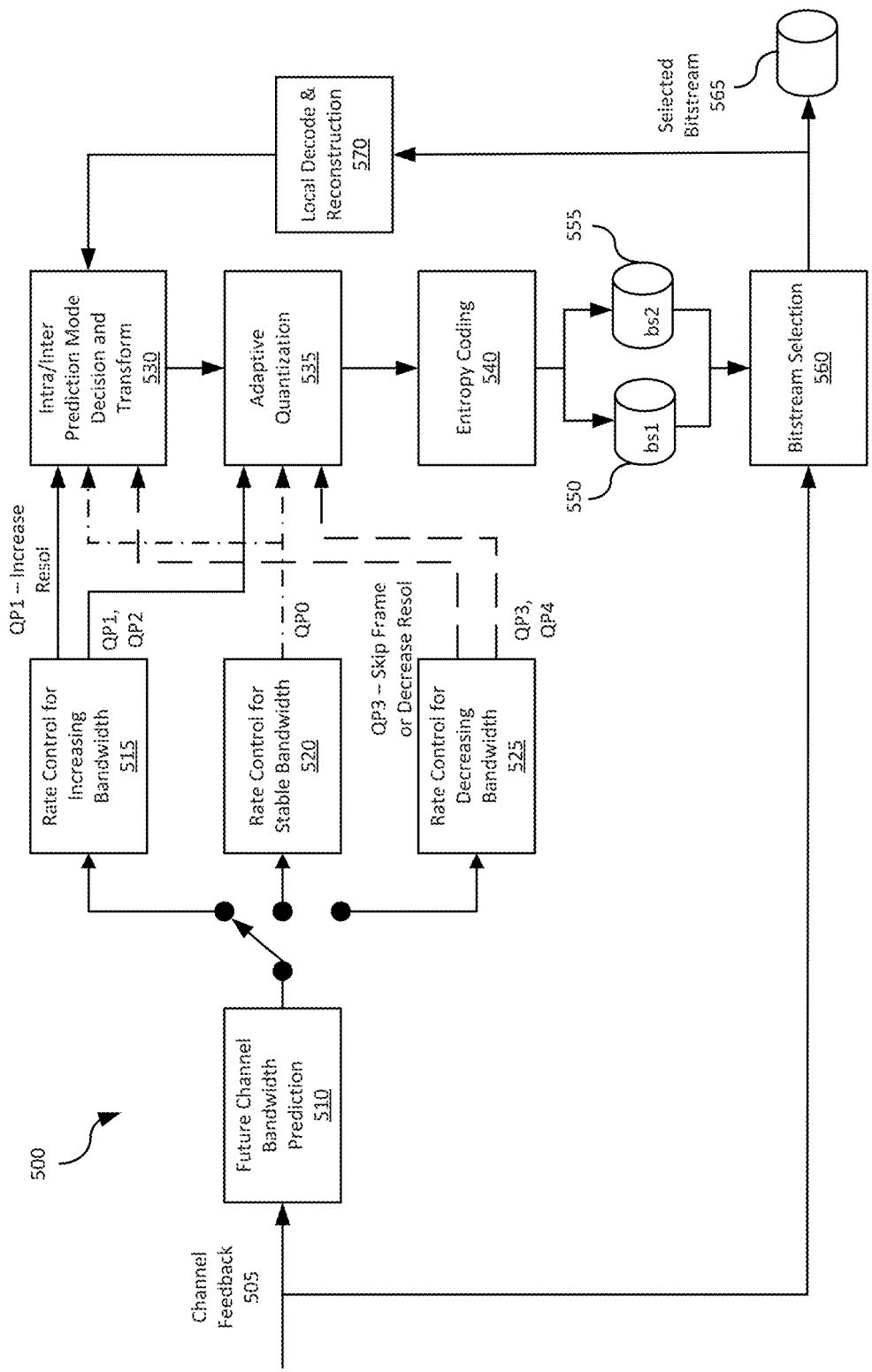
FIG. 5 is an illustration of a video coding process utilizing transport control according to some embodiments.

FIG. 5 is an illustration of a video coding process utilizing transport control according to some embodiments. In some embodiments, a video coding process 500 may be as illustrated in FIG. 5, wherein channel feedback 505 of a network channel is utilized for a future channel bandwidth prediction (or estimation) 510. The future channel bandwidth prediction 510 is based on channel throughput feedback from transport (such as transport mechanism 330 illustrated in FIG. 3), with the predicted throughput/bandwidth being provided to one of multiple rate control components (or modules) for the following frames. In some embodiments, the components are a rate control component for increasing bandwidth 515, a rate control component for stable bandwidth 520, and a rate control component for decreasing bandwidth 525. As illustrated, the process 500 further includes intra/inter prediction mode decision and transform 530, adaptive quantization 535, and entropy coding to generate one or more of bitstreams bs1 550 and bs2 555.

Thus, if the future channel bandwidth prediction 510 indicates that the network throughput/bandwidth is moving upward, a rate control component for increasing bandwidth 515 is triggered. The component 515 is to generate two target frame sizes, a first target frame size based on a previous frame and a second target frame size based on the estimated increase in bandwidth. The component further is to generate and output two QPs (QP1 based on the first target frame size and QP2 based on the second target frame size). In some embodiments, if QP2 is smaller than a threshold, then video resolution may be increased, thereby increasing video quality. Otherwise, one QP (QP1) is used for regular intra/inter prediction, mode decision, and transform 530, and both QPs (QP1 and QP2) are used for adaptive quantization 535 to generate two bitstreams (illustrated as bs1 550 and bs2 555) in entropy coding 540, the bitstreams being a first bitstream based on a stable channel bandwidth and a second bitstream based on an increasing channel bandwidth.

If the future channel bandwidth prediction 510 indicates the network throughput/bandwidth is stable, a rate control component for stable bandwidth 520 is triggered. The component 520 is to generate a single target frame size based on the previous frame, and is to output a single QP (QP0) based on the single target frame size, wherein QP0 is used for the full encoding process of the current frame. In this manner, when there is an estimate indicating a stable channel bandwidth, only a single bitstream is required and generated.

If the future channel bandwidth prediction 510 indicates the network throughput/bandwidth is moving downward, a rate control component for decreasing bandwidth 525 is triggered. The component 525 is to generate two target frame sizes, a first target frame size based on the previous frame and a second target frame size based on the decrease in channel bandwidth. The component 525 is further to generate two QPs (QP3 based on the first target frame size and QP4 based on the second target frame size)) and a frame skip decision. In some embodiments, if QP4 is greater than a threshold, then frame skip may be set, and the following encoding process is skipped and the whole frame is coded as skip; or, alternatively, video resolution may be decreased to reduce bandwidth requirements. Otherwise, one QP (QP3) is used for intra/inter prediction, mode decision, and transform 530, and both QPs (QP3 and QP4) are used for adaptive quantization 535 to generate two bitstreams (illustrated as bs1 550 and bs2 555) in entropy coding 540, the bitstreams being a first bitstream based on a stable channel bandwidth and a second bitstream based on a decreasing channel bandwidth.

In some embodiments, the process 500 further includes bitstream selection 560 based on instant (current) channel feedback. When two bitstreams are available (bs1 550 and bs2 555), only one bitstream is selected and sent out to the transport, shown as the selected bitstream 565. In some embodiments, if instant channel feedback is available, a new instant target frame size is estimated and bitstream selection 560 is to select the bitstream size that is closer to the instant target frame size. If instant channel feedback is not available, the bitstream based on the second target frame size, i.e., the bitstream based on an increased channel bandwidth or decreased channel bandwidth, is selected and sent out. Local decode and reconstruction 570 is applied on the selected bitstream to generate the reference frame for the subsequent frames.

While the discussion herein generally describes one or two target frame sizes, embodiments are not limited to this particular implementation. In some embodiments, an apparatus, system, or process is extended to generate more target frame sizes to provide more accurate control corresponding to the channel variations. For example, in a circumstance in which a large channel throughput increase or decrease is predicted, a component or module may generate three frame sizes, a first target frame size for a stable channel bandwidth, a second target frame size for a moderate bandwidth increase or decrease, and a third target frame size for the estimated band increase or decrease. i.e., as a larger increase or decrease. In some embodiments, the component or module may generate three QPs based on the three target frame sizes, and encoding may use the three values to generate three bitstreams. In this manner, if there is a potential for a significant channel change, the apparatus, system, or process is prepared with three (or any other number) bitstreams from which to select for the current frame.

In some embodiments, an apparatus, system, or process may utilize transport based video coding to provide low latency and quality improvements without requiring great complexity or memory requirements. In some embodiments, the apparatus, system, or process includes automatic predication of future network changes, and adjusts generation of QP form video encoding accordingly.

Further, an embodiment is not required to encode multiple bitstreams if the network condition is smooth (i.e., has a stable bandwidth), with the generation of multiple bitstreams only occurring when throughput conditions are moving up and down sharply. Further, an embodiment is not required to encode two bitstreams twice, but rather applies two QPs to the adaptive quantization and entropy coding phases. As this is roughly less than 30% of the encode time, this does not require doubling of memory footprint and memory bandwidth, but rather a lesser amount.

Figure 6:
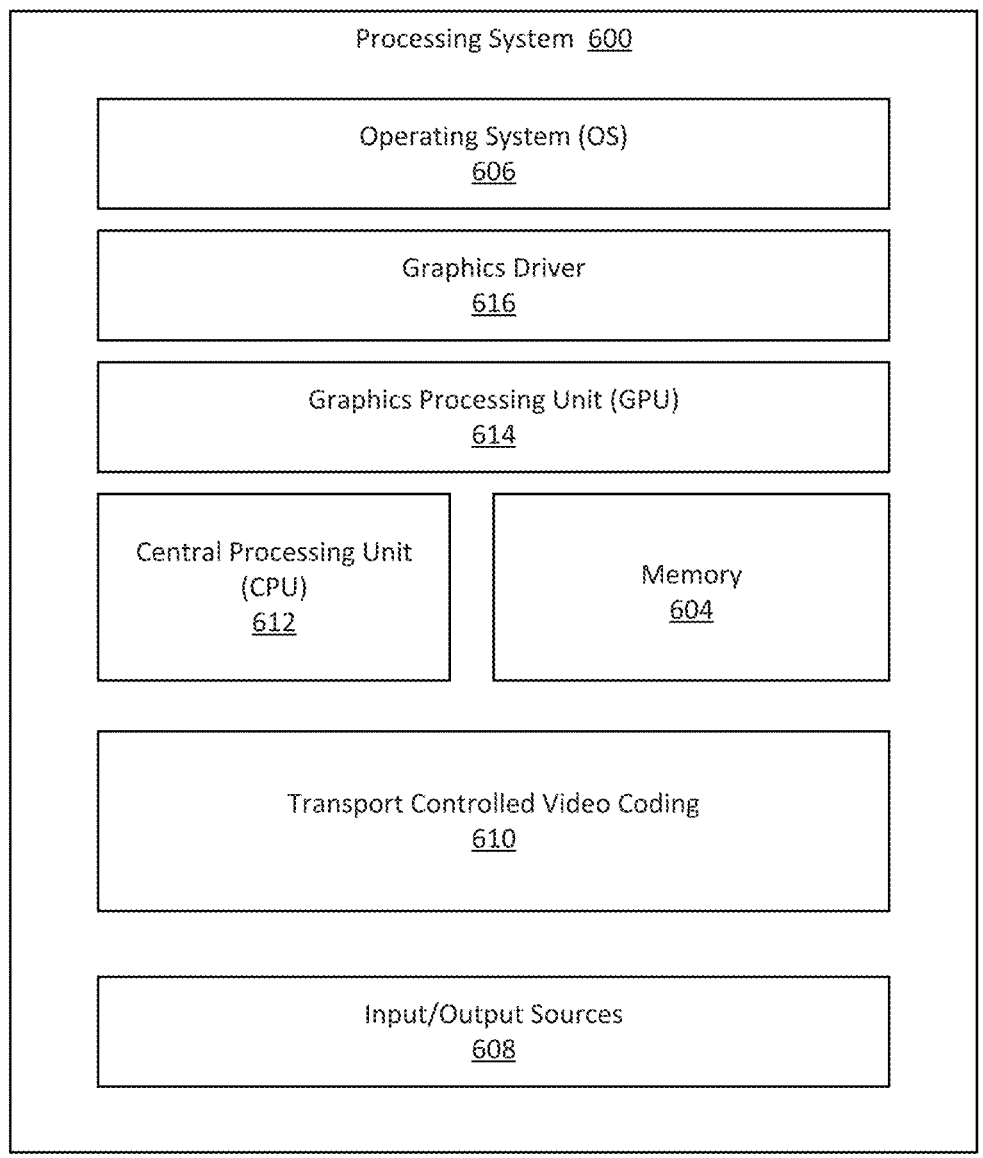
FIG. 6 illustrates a novel processing system including transport controlled video coding according to some embodiments.

FIG. 6 illustrates a novel processing system including transport controlled video coding according to some embodiments. For example, in one embodiment, a transport controlled video coding mechanism 610 of FIG. 6 may be employed or hosted by computing device 600, such as computing device 700 of FIG. 7. Computing device 600 represents a communication and data processing device including or representing any number and type of smart devices, such as (without limitation) smart command devices or intelligent personal assistants, home/office automation system, home appliances (e.g., security systems, washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet based cable television set-top boxes, etc.), global positioning system (GPS)-based devices, etc.

In some embodiments, computing device 600 may include (without limitation) autonomous machines or artificially intelligent agents, such as a mechanical agents or machines, electronics agents or machines, virtual agents or machines, electro-mechanical agents or machines, etc. Examples of autonomous machines or artificially intelligent agents may include (without limitation) robots, autonomous vehicles (e.g., self-driving cars, self-flying planes, self-sailing boats or ships, etc.), autonomous equipment (self-operating construction vehicles, self-operating medical equipment, etc.), and/or the like. Further, "autonomous vehicles" are not limited to automobiles and may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 600 may include a cloud computing platform consisting of a plurality of server computers, where each server computer employs or hosts a multifunction perceptron mechanism. For example, automatic ISP (Image Signal Processor) tuning may be performed using component, system, and architectural set-ups described earlier in this document. For example, some of the aforementioned types of devices may be used to implement a custom learned procedure, such as using field-programmable gate arrays (FPGAs), etc.

Further, for example, computing device 600 may include a computer platform hosting an integrated circuit ("IC"), such as a system on a chip ("SoC" or "SOC"), integrating various hardware and/or software components of computing device 600 on a single chip.

As illustrated, in one embodiment, computing device 600 may include any number and type of hardware and/or software components, such as (without limitation) graphics processing unit 614 ("GPU" or simply "graphics processor"), graphics driver 616 (also referred to as "GPU driver", "graphics driver logic", "driver logic", user-mode driver (UMD), user-mode driver framework (UMDF), or simply "driver"), central processing unit 612 ("CPU" or simply "application processor"), memory 604, network devices, drivers, or the like, as well as input/output (IO) sources 608, such as touchscreens, touch panels, touch pads, virtual or regular keyboards, virtual or regular mice, ports, connectors, etc. Computing device 600 may include an operating system (OS) serving as an interface between hardware and/or physical resources of computing device 600 and a user.

It is to be appreciated that a lesser or more equipped system than the example described above may be preferred for certain implementations. Therefore, the configuration of computing device 600 may vary from implementation to implementation depending upon numerous factors, such as price constraints, performance requirements, technological improvements, or other circumstances.

Embodiments may be implemented as any or a combination of: one or more microchips or integrated circuits interconnected using a system board, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

In one embodiment, transport controlled video coding mechanism 610 may be hosted by memory 604 of computing device 600. In another embodiment, transport controlled video coding mechanism 610 may be hosted by or be part of operating system 606 of computing device 600. In another embodiment, transport controlled video coding mechanism 610 may be hosted or facilitated by graphics driver 616. In yet another embodiment, transport controlled video coding mechanism 610 may be hosted by or part of graphics processing unit 614 ("GPU" or simply "graphics processor") or firmware of graphics processor 614. For example, transport controlled video coding mechanism 610 may be embedded in or implemented as part of the processing hardware of graphics processor 612. Similarly, in yet another embodiment, transport controlled video coding mechanism 610 may be hosted by or part of central processing unit 612 ("CPU" or simply "application processor"). For example, transport controlled video coding mechanism 610 may be embedded in or implemented as part of the processing hardware of application processor 612.

In yet another embodiment, transport controlled video coding mechanism 610 may be hosted by or part of any number and type of components of computing device 600, such as a portion of transport controlled video coding mechanism 610 may be hosted by or part of operating system 606, another portion may be hosted by or part of graphics processor 614, another portion may be hosted by or part of application processor 612, while one or more portions of transport controlled video coding mechanism 610 may be hosted by or part of operating system 606 and/or any number and type of devices of computing device 600. It is contemplated that embodiments are not limited to certain implementation or hosting of transport controlled video coding mechanism 610 and that one or more portions or components of transport controlled video coding mechanism 610 may be employed or implemented as hardware, software, or any combination thereof, such as firmware.

Computing device 600 may host network interface(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), 5th Generation (5G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media (including a non-transitory machine-readable or computer-readable storage medium) having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic tape, magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 7:
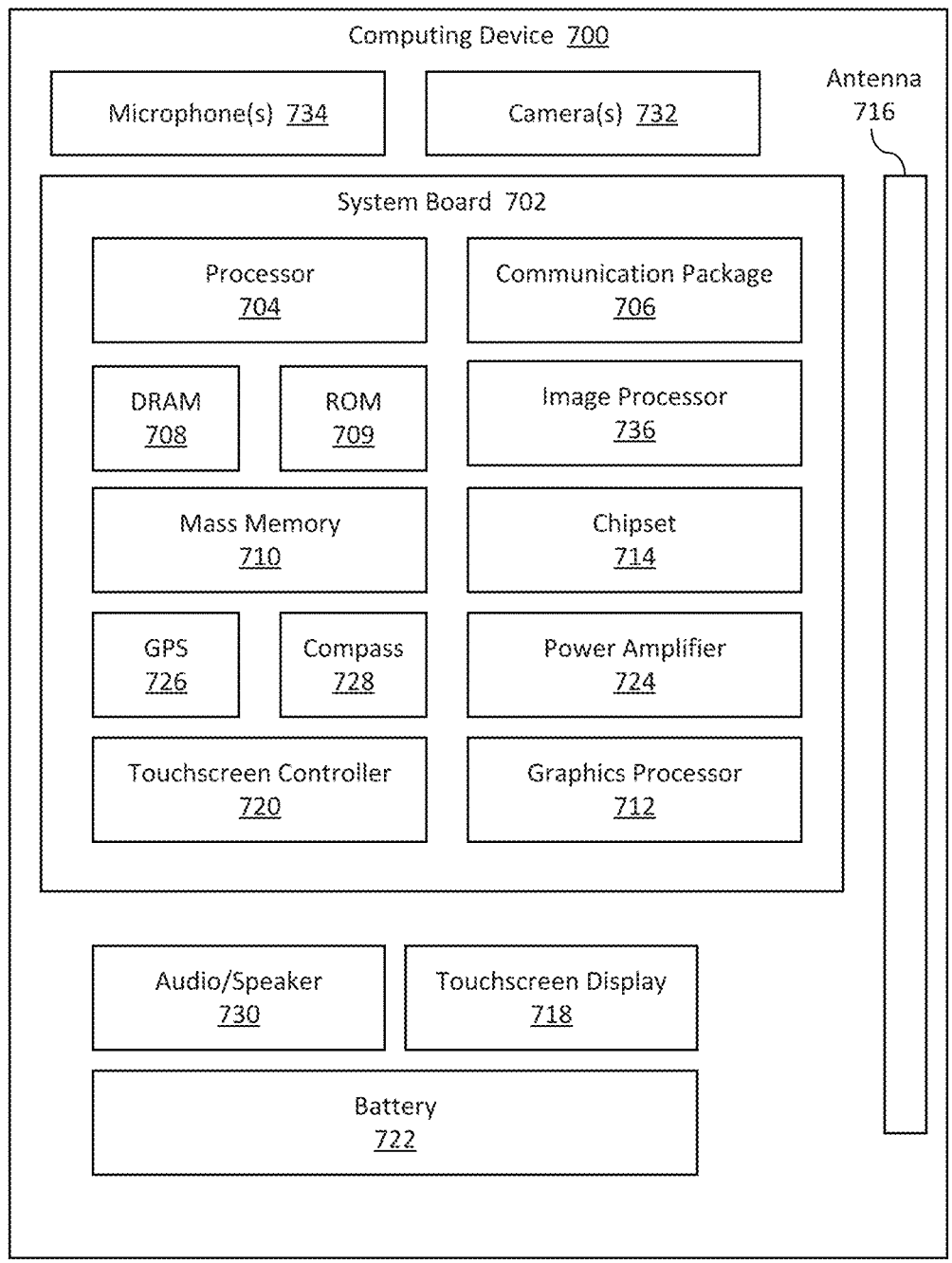
FIG. 7 illustrates a computing device according to some embodiments.

FIG. 7 illustrates a computing device according to some embodiments. It is contemplated that details of computing device 700 may be the same as or similar to details of processing system 600 of FIG. 6 and thus for brevity, certain of the details discussed with reference to processing system 600 of FIG. 6 are not discussed or repeated hereafter. Computing device 700 houses a system board 702 (which may also be referred to as a motherboard, main circuit board, or other terms)). The system board 702 may include a number of components, including but not limited to a processor 704 and at least one communication package or chip 706. The communication package 706 is coupled to one or more antennas 716. The processor 704 is physically and electrically coupled to the board 702.

Depending on its applications, computing device 700 may include other components that may or may not be physically and electrically coupled to the system board 702. These other components include, but are not limited to, volatile memory (e.g., DRAM) 708, nonvolatile memory (e.g., ROM) 709, flash memory (not shown), a graphics processor 712, a digital signal processor (not shown), a crypto processor (not shown), a chipset 714, an antenna 716, a display 718 such as a touchscreen display, a touchscreen controller 720, a battery 722, an audio codec (not shown), a video codec (not shown), a power amplifier 724, a global positioning system (GPS) device 726, a compass 728, an accelerometer (not shown), a gyroscope (not shown), a speaker or other audio element 730, one or more cameras 732, a microphone array 734, and a mass storage device (such as hard disk drive) 710, compact disk (CD) (not shown), digital versatile disk (DVD) (not shown), and so forth). These components may be connected to the system board 702, mounted to the system board, or combined with any of the other components.

The communication package 706 enables wireless and/or wired communications for the transfer of data to and from the computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 706 may implement any of a number of wireless or wired standards or protocols, including but not limited to Wi-Fi (IEEE 802.11 family), WiMAX (IEEE 802.16 family), IEEE 802.20, long term evolution (LTE), Ev-DO (Evolution Data Optimized), HSPA+, HSDPA+, HSUPA+, EDGE Enhanced Data rates for GSM evolution), GSM (Global System for Mobile communications), GPRS (General Package Radio Service), CDMA (Code Division Multiple Access), TDMA (Time Division Multiple Access), DECT (Digital Enhanced Cordless Telecommunications), Bluetooth, Ethernet derivatives thereof, as well as any other wireless and wired protocols that are designated as 3G, 4G, 5G, and beyond. The computing device 700 may include a plurality of communication packages 706. For instance, a first communication package 706 may be dedicated to shorter range wireless communications such as Wi-Fi and Bluetooth and a second communication package 706 may be dedicated to longer range wireless communications such as GSM, EDGE, GPRS, CDMA, WiMAX, LTE, Ev-DO, and others.

The cameras 732 including any depth sensors or proximity sensor are coupled to an optional image processor 736 to perform conversions, analysis, noise reduction, comparisons, depth or distance analysis, image understanding, and other processes as described herein. The processor 704 is coupled to the image processor 736 to drive the process with interrupts, set parameters, and control operations of image processor and the cameras. Image processing may instead be performed in the processor 704, the graphics processor 712, the cameras 732, or in any other device.

In various implementations, the computing device 700 may be a laptop, a netbook, a notebook, an Ultrabook, a smartphone, a tablet, a personal digital assistant (PDA), an ultra-mobile PC, a mobile phone, a desktop computer, a server, a set-top box, an entertainment control unit, a digital camera, a portable music player, or a digital video recorder. The computing device may be fixed, portable, or wearable. In further implementations, the computing device 700 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

In some embodiments, an apparatus includes one or more processors to process data; a memory to store data, including data for video streaming; and a video processing mechanism including an encoder and a transport mechanism, wherein the video processing mechanism is to generate a prediction of channel throughput for a network channel, encode one or more bitstreams based on the prediction, including encoding a plurality of bitstreams including a first bitstream and a second bitstream if the prediction indicates an increase or decrease in channel throughput and encoding a single bitstream if the prediction indicates a stable channel throughput, and select a bitstream of the one or more bitstreams for a current frame.

In some embodiments, encoding one or more bitstreams includes the video processing mechanism to generate a plurality of target frame sizes if the prediction indicates an increase or decrease in channel throughput and to generate a single target frame size if the prediction indicates a stable channel throughput.

In some embodiments, the plurality of target frame sizes includes a first target frame size based on a previous frame size and a second target frame size based on the prediction, and wherein the single target frame size is based on the previous frame size.

In some embodiments, encoding one or more bitstreams includes the video processing mechanism to generate a first quantization parameter based on the first target frame size and a second quantization parameter based on the second target frame size for a prediction indicating an increase or decrease in channel throughput, and the video processing mechanism to generate a single quantization parameter based on the single target frame size for a prediction indicating a stable channel throughput.

In some embodiments, the video processing mechanism includes a first component to provide intra/inter prediction, mode decision, and transform, and wherein the first component is to receive the first quantization parameter or is to receive the single quantization parameter.

In some embodiments, the video processing mechanism includes a second component to provide adaptive quantization, and wherein the second component is to receive the both the first quantization parameter and the second quantization parameter to generate the first bitstream and the second bitstream respectively or is to receive the single quantization parameter to generate the single bitstream.

In some embodiments, when instant channel feedback is available, selecting between the first bitstream and the second bitstream for a current frame includes the video processing mechanism to estimate an instant target frame size based on the instant channel feedback, and to select whichever of the first bitstream and a second bitstream is closer to the instant target frame size.

In some embodiments, when instant channel feedback is not available, selecting between the first bitstream and the second bitstream for a current frame includes the video processing mechanism to select the second bitstream.

In some embodiments, encoding one or more bitstreams does not include generation of a target bit rate.

In some embodiments, a method includes generating a prediction of channel throughput for a network channel; encoding one or more bitstreams based on the prediction, including encoding a plurality of bitstreams including a first bitstream and a second bitstream if the prediction indicates an increase or decrease in channel throughput and encoding a single bitstream if the prediction indicates a stable channel throughput; and selecting a bitstream of the one or more bitstreams for a current frame.

In some embodiments, encoding one or more bitstreams includes generating a plurality of target frame sizes if the prediction indicates an increase or decrease in channel throughput, and generating a single target frame size if the prediction indicates a stable channel throughput.

In some embodiments, wherein the plurality of target frame sizes includes a first target frame size based on a previous frame size and a second target frame size based on the prediction, and wherein the single target frame size is based on the previous frame size.

In some embodiments, encoding one or more bitstreams includes generating a first quantization parameter based on the first target frame size and a second quantization parameter based on the second target frame size for a prediction indicating an increase or decrease in channel throughput, and generating a single quantization parameter based on the single target frame size for a prediction indicating a stable channel throughput.

In some embodiments, the method further includes performing intra/inter prediction, mode decision, and transform utilizing the first quantization parameter or the single quantization parameter.

In some embodiments, the method further includes performing adaptive quantization utilizing both the first quantization parameter and the second quantization parameter to generate the first bitstream and the second bitstream respectively or utilizing the single quantization parameter to generate the single bitstream.

In some embodiments, when instant channel feedback is available, selecting between the first bitstream and the second bitstream for a current frame includes estimating an instant target frame size based on the instant channel feedback, and selecting whichever of the first bitstream and a second bitstream is closer to the instant target frame size.

In some embodiments, when instant channel feedback is not available, selecting between the first bitstream and the second bitstream for a current frame includes selecting the second bitstream.

In some embodiments, for a prediction indicating an increase in channel throughput, the method further includes increasing a video resolution upon determining that the second quantization parameter is less than a first threshold.

In some embodiments, for a prediction indicating a decrease in channel throughput, the method further includes either skipping a frame or decreasing a video resolution upon determining that the second quantization parameter is greater than a second threshold.

In some embodiments, a non-transitory computer-readable storage medium having stored thereon data representing sequences of instructions that, when executed by one or more processors, cause the one or more processors to perform operations including generating a prediction of channel throughput for a network channel; encoding one or more bitstreams based on the prediction, including encoding a plurality of bitstreams including a first bitstream and a second bitstream if the prediction indicates an increase or decrease in channel throughput and encoding a single bitstream if the prediction indicates a stable channel throughput; and selecting a bitstream of the one or more bitstreams for a current frame.

In some embodiments, encoding one or more bitstreams includes generating a plurality of target frame sizes if the prediction indicates an increase or decrease in channel throughput, and generating a single target frame size if the prediction indicates a stable channel throughput.

In some embodiments, the plurality of target frame sizes includes a first target frame size based on a previous frame size and a second target frame size based on the prediction, and wherein the single target frame size is based on the previous frame size.

In some embodiments, encoding one or more bitstreams includes generating a first quantization parameter based on the first target frame size and a second quantization parameter based on the second target frame size for a prediction indicating an increase or decrease in channel throughput, and generating a single quantization parameter based on the single target frame size for a prediction indicating a stable channel throughput.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer. In some embodiments, a non-transitory computer-readable storage medium has stored thereon data representing sequences of instructions that, when executed by a processor, cause the processor to perform certain operations.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C.

When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. An apparatus comprising:
   one or more processors coupled to memory; and
   video processing circuitry coupled to the one or more processors, the video processing circuitry to:
   generate a prediction of channel throughput for a network channel,
   encode one or more bitstreams based on the prediction, including encoding a plurality of bitstreams including a first bitstream and a second bitstream if the prediction indicates an increase or decrease in channel throughput and encoding a single bitstream if the prediction indicates a stable channel throughput, wherein encoding includes generating (a) multiple quantization parameters based on multiple target frame sizes relating to changes to the channel throughput or (b) a single quantization parameter based on a single target frame size relating to the stable channel throughput, and
   select a bitstream of the one or more bitstreams for a current frame.

2. The apparatus of claim 1, wherein the multiple target frame sizes include a first target frame size based on a previous frame size and a second target frame size based on the prediction, and wherein the single target frame size is based on the previous frame size.

3. The apparatus of claim 1, wherein the multiple quantization parameters include a first quantization parameter based on the first target frame size and a second quantization parameter based on the second target frame size for the prediction indicating the increase or decrease in the channel throughput.

4. The apparatus of claim 1, wherein the video processing circuitry includes a first component to provide one or more of an intra/inter prediction, a mode decision, and a transform, and wherein the first component to receive one or more of the multiple quantization parameters or the single quantization parameter.

5. The apparatus of claim 1, wherein the video processing circuitry includes a second component to provide adaptive quantization, and wherein the second component is to receive the first quantization parameter and the second quantization parameter to generate the first bitstream and the second bitstream, respectively, or the single quantization parameter to generate the single bitstream.

6. The apparatus of claim 1, wherein the video processing circuitry is further to, when an instant channel feedback is available, select between the first bitstream and the second bitstream for a current frame to estimate an instant target frame size based on the instant channel feedback, and to select whichever of the first bitstream and a second bitstream is closer to the instant target frame size.

7. The apparatus of claim 6, wherein the video processing circuitry is further to, when the instant channel feedback is not available, select between the first bitstream and the second bitstream for a current frame to select the second bitstream, wherein encoding one or more bitstreams does not include generation of a target bit rate.

8. A method comprising:
   generating a prediction of channel throughput for a network channel;
   encoding one or more bitstreams based on the prediction, including encoding a plurality of bitstreams including a first bitstream and a second bitstream if the prediction indicates an increase or decrease in channel throughput and encoding a single bitstream if the prediction indicates a stable channel throughput, wherein encoding includes generating (a) multiple quantization parameters based on multiple target frame sizes relating to changes to the channel throughput or (b) a single quantization parameter based on a single target frame size relating to the stable channel throughput; and
   selecting a bitstream of the one or more bitstreams for a current frame.

9. The method of claim 8, wherein the multiple target frame sizes include a first target frame size based on a previous frame size and a second target frame size based on the prediction, and wherein the single target frame size is based on the previous frame size.

10. The method of claim 8, wherein the multiple quantization parameters include a first quantization parameter based on the first target frame size and a second quantization parameter based on the second target frame size for the prediction indicating the increase or decrease in the channel throughput.

11. The method of claim 8, further comprising performing one or more of an intra/inter prediction, a mode decision, and a transform utilizing the first quantization parameter or the single quantization parameter.

12. The method of claim 8, further comprising performing adaptive quantization utilizing both the first quantization parameter and the second quantization parameter to generate the first bitstream and the second bitstream, respectively, or utilizing the single quantization parameter to generate the single bitstream, wherein, when instant channel feedback is available, selecting between the first bitstream and the second bitstream for a current frame includes estimating an instant target frame size based on the instant channel feedback, and selecting whichever of the first bitstream and a second bitstream is closer to the instant target frame size.

13. The method of claim 12, wherein, when instant channel feedback is not available, selecting between the first bitstream and the second bitstream for a current frame includes selecting the second bitstream.

14. The method of claim 12, wherein, for a prediction indicating an increase in channel throughput, further comprising increasing a video resolution upon determining that the second quantization parameter is less than a first threshold, wherein, for a prediction indicating a decrease in channel throughput, further comprising either skipping a frame or decreasing a video resolution upon determining that the second quantization parameter is greater than a second threshold.

15. The computer-readable storage medium of claim 12, wherein, when instant channel feedback is not available, selecting between the first bitstream and the second bitstream for a current frame includes selecting the second bitstream, and wherein, for a prediction indicating an increase in channel throughput, further comprising increasing a video resolution upon determining that the second quantization parameter is less than a first threshold, wherein, for a prediction indicating a decrease in channel throughput, further comprising either skipping a frame or decreasing a video resolution upon determining that the second quantization parameter is greater than a second threshold.

16. A computer-readable storage medium having stored thereon data representing sequences of instructions which, when executed, cause a computing device to perform operations comprising:
   generating a prediction of channel throughput for a network channel;
   encoding one or more bitstreams based on the prediction, including encoding a plurality of bitstreams including a first bitstream and a second bitstream if the prediction indicates an increase or decrease in channel throughput and encoding a single bitstream if the prediction indicates a stable channel throughput, wherein encoding includes generating (a) multiple quantization parameters based on multiple target frame sizes relating to changes to the channel throughput or (b) a single quantization parameter based on a single target frame size relating to the stable channel throughput; and
   selecting a bitstream of the one or more bitstreams for a current frame.

17. The computer-readable storage medium of claim 16, wherein the multiple target frame sizes include a first target frame size based on a previous frame size and a second target frame size based on the prediction, and wherein the single target frame size is based on the previous frame size.

18. The computer-readable storage medium of claim 16, wherein the multiple quantization parameters include a first quantization parameter based on the first target frame size and a second quantization parameter based on the second target frame size for the prediction indicating the increase or decrease in the channel throughput.

19. The computer-readable storage medium of claim 16, wherein the operations further comprise:
   performing one or more of an intra/inter prediction, a mode decision, and a transform utilizing the first quantization parameter or the single quantization parameter; and
   performing adaptive quantization utilizing both the first quantization parameter and the second quantization parameter to generate the first bitstream and the second bitstream, respectively, or utilizing the single quantization parameter to generate the single bitstream, wherein, when instant channel feedback is available, selecting between the first bitstream and the second bitstream for a current frame includes estimating an instant target frame size based on the instant channel feedback, and selecting whichever of the first bitstream and a second bitstream is closer to the instant target frame size.

* * * * *